United States Patent
Keesara et al.

(10) Patent No.: US 9,954,750 B2
(45) Date of Patent: Apr. 24, 2018

(54) DEBUGGING AUTO-ATTACH ENTITIES (CLIENT AND PROXY) USING CONNECTIVITY FAULT MANAGEMENT (CFM) AND SHORTEST PATH BRIDGING MAC (SPBM) CLOUD

(71) Applicant: Extreme Networks, Inc., San Jose, CA (US)

(72) Inventors: Srikanth Keesara, Tewksbury, MA (US); Deborah Ellen Fitzgerald, Acton, MA (US)

(73) Assignee: Extreme Networks, Inc., San Jose, CA (US)

( * ) Notice: Subject to any disclaimer, the term of this patent is extended or adjusted under 35 U.S.C. 154(b) by 307 days.

(21) Appl. No.: 14/744,294

(22) Filed: Jun. 19, 2015

(65) Prior Publication Data
US 2016/0373318 A1 Dec. 22, 2016

(51) Int. Cl.
*G06F 15/16* (2006.01)
*H04L 12/26* (2006.01)
*H04L 12/46* (2006.01)

(52) U.S. Cl.
CPC .......... *H04L 43/0811* (2013.01); *H04L 12/46* (2013.01); *H04L 43/10* (2013.01)

(58) Field of Classification Search
CPC ....... H04L 43/0811; H04L 43/10; H04L 12/46
See application file for complete search history.

(56) References Cited

U.S. PATENT DOCUMENTS

| 8,750,299 B2 | 6/2014 | Keesara et al. | |
|---|---|---|---|
| 2012/0063453 A1* | 3/2012 | Keesara | H04L 12/185 370/390 |
| 2013/0250810 A1* | 9/2013 | Ho | H04L 41/12 370/255 |

OTHER PUBLICATIONS

NPL, Don Fedyk, "Shortest Path Bridging, IEEE 802.1aq Overview", Jul. 2010.*

* cited by examiner

*Primary Examiner* — Padma Mundur
(74) *Attorney, Agent, or Firm* — Haley Guiliano LLP

(57) ABSTRACT

A computer-implemented method, apparatus and software for debugging auto-attach entities is presented. A Continuity Fault Management (CFM) request for a service is received over a network at an Auto-Attach (AA) server. The AA server responds with a first response regarding the AA server on the service. The AA server also responds to the CFM request with a second response regarding any AA clients and any AA proxies on the service.

14 Claims, 5 Drawing Sheets

150

160

DEBUGGING AUTO-ATTACH ENTITIES (CLIENT AND PROXY) USING CONNECTIVITY FAULT MANAGEMENT (CFM) AND SHORTEST PATH BRIDGING MAC (SPBM) CLOUD

BACKGROUND

One type of network technology is known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node in Mac-in-Mac 802.1ah and transported only to other members of the logical network. IEEE 802.1aq supports unicast and multicast, and all routing is on symmetric shortest paths. There exist other related technologies that follow the model of a provider network (transport network) that connects two or more customer networks (access networks), where the provider network is functionally distinct from the customer network, even if a single administrator runs both networks.

The SPB network typically includes a Backbone Edge Bridge (BEB) and a Backbone Core Bridge (BCB). BEBs (also known as provider network edge nodes) function as devices that enable transfer of packets to/from interfaces within the SPB network and to/from interfaces outside the SPB network.

Connectivity Fault Management (CFM) is an end-to-end per-service-instance Ethernet layer protocol that includes proactive connectivity monitoring, fault verification, and fault isolation. CFM uses maintenance points. A maintenance point is a demarcation point on an interface (port) that participates in CFM within a maintenance domain. Maintenance points on device ports act as filters that confine CFM frames within the bounds of a domain by dropping frames that do not belong to the correct level. Two classes of maintenance points exist, Maintenance Endpoints (MEPs) and Maintenance Intermediate points (MIPs).

MEPS exist at a per-maintenance domain (level) and service provider VLAN (S-VLAN). MEPs at an edge of a domain define the domain boundary. MEPs within the bounds of a maintenance domain confine CFM messages. When configured to do so, MEPs proactively transmit CFM continuity check messages (CCMs). At the request of an administrator, MEPs transmit traceroute and loopback messages.

MIPs exist at a per maintenance domain (level) and for all S-VLANs enabled or allowed on a port. MIPS are internal to a domain, not at the boundary. CFM frames received from MEPs and other MIPs are cataloged and forwarded. CFM frames at a lower level are stopped and dropped. All CFM frames at a higher level are forwarded.

Auto-attach is a proposed solution to allow devices which do not support Shortest Path Bridging (SPB) to attach to the SPBM network. To ensure the network is properly set-up and operating, the solution must ensure that there is appropriate debugging capabilities. Moreover, the network administrator must be able to confirm which devices have auto-attached to the network.

SUMMARY

Conventional SPB and CFM environments, such as those explained above suffer from a variety of deficiencies. As is known in the art, an l2tracetree provides processing of a data packet(s) and/or a response(s) in order to discover and graphically represent all the paths within a hierarchical tree of network devices for multicast traffic flows. Specifically, in various embodiments, a first network device receives a data packet (such as a CFM data packet or CFM message). The data packet provides a multicast target Media Access Control (MAC) address. The first network device forwards the data packet to a plurality of network devices, where each of the plurality of the network devices belong to a multicast group identified according to the multicast target MAC address. Based on receipt of the data packet, the first network device generates and transmits a first response to a source of the data packet. The first response indicates a placement of the first network device with respect to a hierarchical tree of the plurality of network devices belonging to the multicast group. Additionally, each of the plurality of the network devices belonging to the multicast group will themselves generate and transmit their own response upon receipt of the data packet forwarded over by the first network device. Such responses will indicate the placement of the corresponding network device with respect to the hierarchical tree network devices belonging to the multicast group as well. Such responses will be sent back through the first network device, which will forward such responses back to a source of the data packet. Further, a graphical representation of the hierarchical tree of the network devices can be rendered based on all the responses sent back to the source of the data packet.

One such deficiency is that when an l2tracetree is performed; this command will trace the entire tree using a given I-SID. However, l2tracetree will not allow a network administrator to see how the I-SID was created (i.e., manually or via auto-attach) and which are the clients for that I-SID. There is no easy way to know without going to each and every box in the network and running a series of show commands.

The present invention provides an extension to CFM which will address the need created by allowed devices to attach to the SPBM network via Auto-attach. The purpose of Auto-Attach is to extend the Shortest Path Bridging (SPB) Fabric and to allow non-SPBM devices to connect to and leverage fabric-based services. The solution will allow the network administrator to determine whether there are rogue devices attached and to easily determine which attached devices are using a given I-SID within the network. It gives a complete view of all the Auto-Attach client/proxies using a given I-SID in a network and thus allows network administrator to debug misconfiguration, detect rogue devices, and achieve complete visibility of traffic flow.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

In a particular embodiment of a method for debugging auto-attach entities (client and proxy) using Connectivity Fault Management (CFM) and Shortest Path Bridging MAC (SPBM) cloud, the method includes receiving, at an Auto-Attach (AA) server, a CFM request over a network. The method also includes responding, by the AA server, with a first response regarding the AA server on a particular service, to the CFM request. The method further includes responding, by the AA server, with a second response regarding any AA clients and any AA servers on the particular service, to the CFM request.

Other embodiments include a computer readable medium having computer readable code thereon for debugging auto-attach entities (client and proxy) using Connectivity Fault Management (CFM) and Shortest Path Bridging MAC (SPBM) cloud. The computer readable medium includes instructions for receiving, at an Auto-Attach (AA) server, a CFM request over a network. The computer readable medium also includes instructions for responding, by the AA server, with a first response regarding the AA server on a particular service, to the CFM request. The computer readable medium further includes instructions for responding, by the AA server, with a second response regarding any AA clients and any AA servers on the particular service, to the CFM request.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process for debugging auto-attach entities (client and proxy) using Connectivity Fault Management (CFM) and Shortest Path Bridging MAC (SPBM) cloud as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations debugging auto-attach entities (client and proxy) using Connectivity Fault Management (CFM) and Shortest Path Bridging MAC (SPBM) cloud as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.—This sentence is repeating twice.

DETAILED DESCRIPTION

Figure 1:
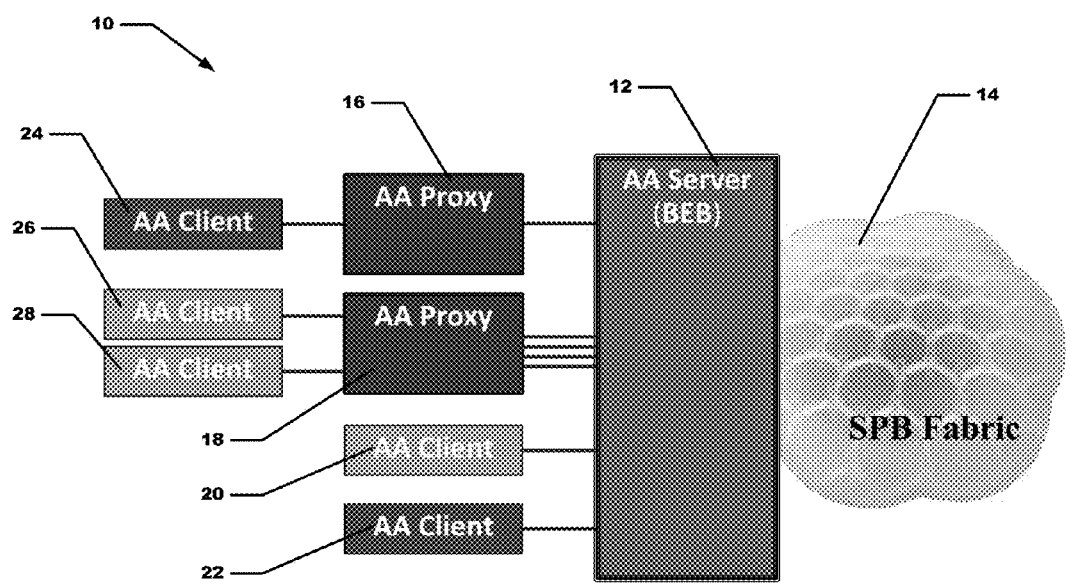
FIG. 1 depicts a block diagram of a first environment for debugging auto-attach entities (client and proxy) using Connectivity Fault Management (CFM) and Shortest Path Bridging MAC (SPBM) cloud in accordance with a particular embodiment of the present invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Auto attach allows clients and proxies to join the SPBM network. These devices join to a local AA server. The local AA server knows which clients have joined a given service, also referred to herein as an Service Instance Identifier (I-SID). However, there needs to be a good way for the network administrator to have view of all the servers that are advertising that isid on behalf of client/proxy. This will allow him to debug, determine rogues, fix configuration issues, and program IDE. Currently, there is not a mechanism to see all the servers that are advertising that ISID on behalf of client/proxy for a given I-SID that have been learned via Auto-Attach. An auto-attach (AA) server accepts requests from auto-attach client and proxies. The client and proxy devices need not support CFM or other layer 2 debugging protocols. The client and proxy devices need not be aware of I-SIDs nor need be capable of performing Mac in Mac (MiM) encapsulation.

The client and proxy attach to the AA server using well know mechanism. One proposed solution is to signal the server using LLDP TLVs which contain I-SID and VLAN mapping requests. The server is I-SID aware and can run 802.1 aq SPBM. The server will create an I-SID on behalf of the client/proxy or will allow that device to join an existing I-SID. The server can perform CFM and can send and receive MiM packets across and participate in an SPBM cloud. The server passes traffic learned on that I-SID to the client/proxy and will encapsulate traffic from them onto that I-SID.

CFM is a standard IEEE protocol. It operates at layer 2 and can be MiM or VLAN encapsulated. CFM allows the use of TLVs in which a given organization can define the contents. The CFM organization TLVs can be used to encode the data that the server knows about the client/proxy devices on a given I-SID and return that information in a CFM response packet. If the request is broadcast and the I-SID is encoded in the request then all the servers in the network with that I-SID will receive the packet. Therefore, the network administrator can quickly access all the clients/proxy for each server in the network using that I-SID. This is useful for debugging when traffic is going to the wrong I-SID, determining when a rogue device has joined an I-SID, and determining whether it is appropriate to send sensitive data on a given I-SID based on known membership.

The network administrator needs to be able to see what devices in the network are participating in auto-attach and what I-SIDs are being used by these devices. A mechanism needs to be created that allows the administrator to easily see all the client/proxy entities.

Ideally, the mechanism will send a message to all the auto-attach servers in the network and have them report back which client/proxy devices are attached for a given I-SID value. The response can provide the server, a port list of client/proxy and an identifier from the client/proxy. There is a handshake between the AA server and its clients and proxies. The AA server keeps a list of all the AA entities that have completed that handshake. Further, the server also keeps a list of the I-SID requests that come from each client/proxy. The AA server can be queried to send the corresponding information back. For example, if auto-attach had been done via the LLDP, the protocol requires that a device sends a chassis id to its neighbor are part of the standard LLDP handshake and also as part of the auto-attach extension it will send a discovery element TLV and I-SID mapping TLV; therefore, the AA server has a list of chassis ids and discovery element information of all its client/proxy entities. Since the client/proxy sends a request to join a specific I-SID and LLDP runs on a port interface, the server also knows these.

Referring to FIG. 1, a first environment 10 is shown. An AA server 12 is in communication with an SPB fabric 14. AA proxy 16 is in communication with AA server 12 and AA client 24. AA proxy 18 is in communication with AA server 12 and with AA client 26 and AA client 28. Environment 10 also includes AA client 20 in communication with AA server 12 and AA client 22 in communication with AA server 12.

The AA client or proxy sends TLVs to the AA Server. The first TLV is used to discover that the client or proxy wants to participate in AA and join the SPB network. The second is assignment in which the client or proxy requests that a Vid and I-SID be created on its behalf. The SPB network uses I-SIDs as the transport mechanism of the MiM packets. The Vid behaves as a VLAN and allows the device that does not understand SPB to receive traffic once it has been decapsulated by the SPB BEB. The AA Server knows all the clients and proxies using a specific I-SID and knows the Identifier/Port for them as well. There can be many AA Servers with clients/proxies in a network. Connectivity Fault Management (CFM) is an IEEE protocol which is used to verify the network path at Layer 2. CFM can be used to debug through and across the SPBM fabric. CFM operates using VLAN and MAC address. Loopback messages (LBM) operate like ping at Layer 2. Linktrace messages (LTM) operate like traceroute at Layer 2. Maintenance Endpoints (MEP) initiate LBM and LTM messages and also respond to LBM and LBM messages. Maintenance Intermediate Point (MIP) can respond to LBM for which the MIP is the target and to LTM for which the MIP is the target or is on the path to the target. The I-SID must exist on the device sending the request. The I-SID may need to be temporarily created if it does not exist. The packet must be one that can traverse the network. CFM Packets conform to an IEEE standard and they can traverse the network. The Server receiving the request will determine whether it has that I-SID and whether it has any clients/proxies using that I-SID. The Server will reply to the sender with a packet that includes identifier for each client/proxy that is using that I-SID.

The Sending box will know the MAC of the Server from parsing the reply and will be able to parse the Identifier for each client/proxy. The sender can format the information for the network administrator in a manner which easily allows him to see all the clients/proxies using a given I-SID.

Figure 2:
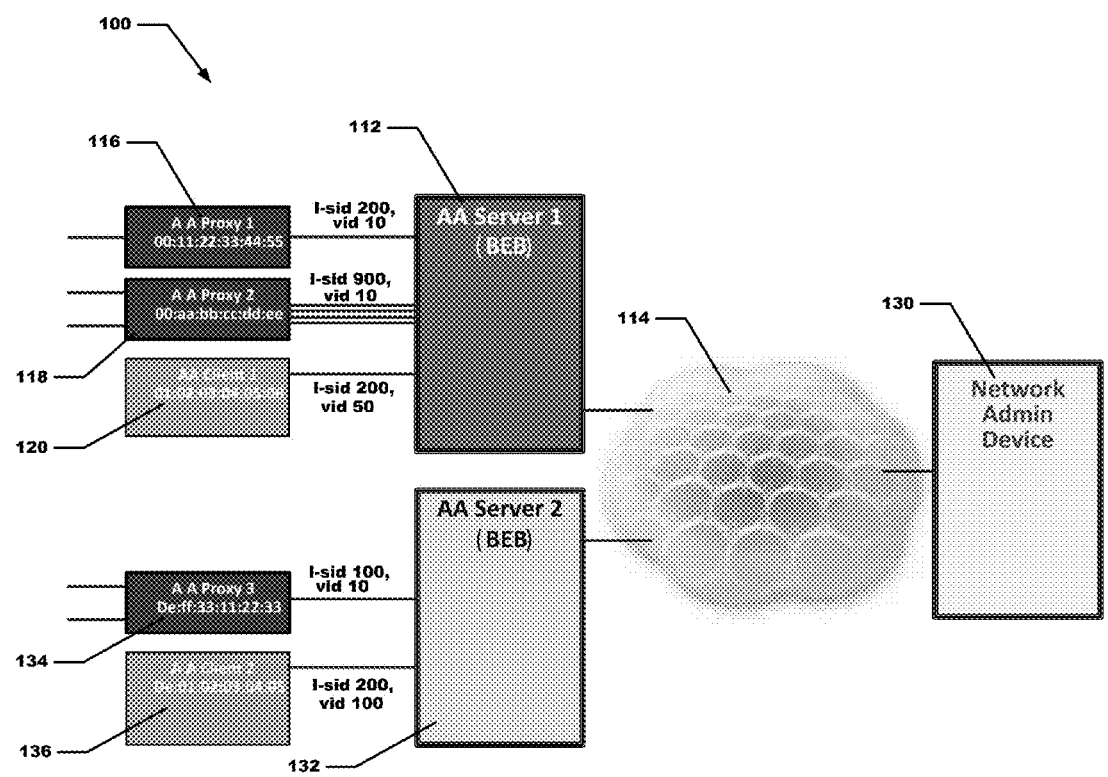
FIG. 2 depicts a block diagram of a second environment for debugging auto-attach entities (client and proxy) using Connectivity Fault Management (CFM) and Shortest Path Bridging MAC (SPBM) cloud in accordance with a particular embodiment of the present invention.

Referring now to FIG. 2, an environment 100 is shown. A first AA server 112 is in communication with an SPB fabric 114. A first AA proxy 116 is in communication with first AA server 112 and belongs to a service I-sid 200, Vid 10. A second AA proxy 116 is in communication with first AA server 112 and belongs to a service I-sid 900, Vid 10. A first AA client 120 is in communication with first AA server 112 and belongs to service I-sid 200, Vid 50.

A second AA server 132 is in communication with an SPB fabric 114. A third AA proxy 134 is in communication with second AA server 132 and belongs to a service I-sid 100, Vid 10. A second AA client 136 is in communication with second AA server 132 and belongs to a service I-sid 200, Vid 100. Also shown is a Network Admin Device 130 in communication with the SPB fabric 114.

In response to a CFM request, the edge node will generates its own response and additionally will generate a response on behalf of the attached device which is outside the network and which may not be CFM capable. If Network Admin Device requested an l2tracetree for I-sid 200, then first AA server 112 would respond on its own behalf, would also send a response for first proxy 116 and also send a response for client 120. In response to the request second AA server 132 would send a response on its own behalf and also send a response on behalf of second AA client 136.

If Network Admin Device requested an l2tracetree for I-sid 100, then first AA server 112 would not respond. In response to the request second AA server 132 would send a response on its own behalf and also send a response on behalf of third proxy 134. If Network Admin Device requested an l2tracetree for I-sid 900, then first AA server 112 would send a response on its own behalf and also send a response on behalf of second proxy 118. In response to the request second AA server 132 would not respond.

Figure 3A:
FIG. 3A depicts a first TLV in accordance with a particular embodiment of the present invention.
Figure 3B:
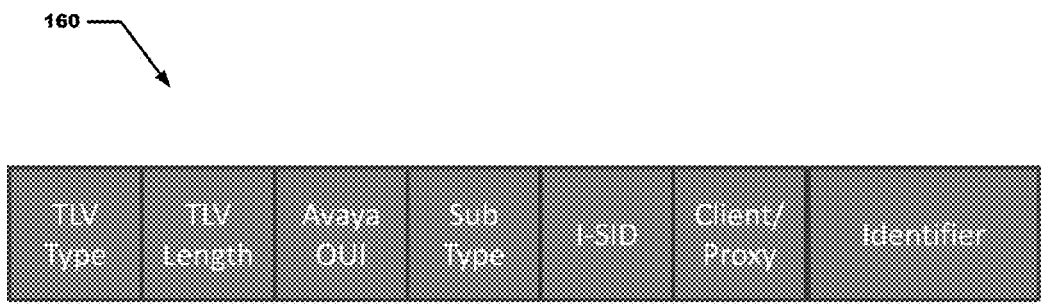
FIG. 3B depicts a second TLV in accordance with a particular embodiment of the present invention.

Referring now to FIG. 3A a TLV 150 is used to indicate AA client/proxy data is shown. The AA Server Node will send a TLV 150 which lists the ports that have client/proxy devices using the I-SID in the response to the request which encoded the I-SID in request. In particular TLV 150 includes an I-SID field 152 and a port bitmap field 154. FIG. 3B shows TLV 160 which the AA Server Node will send, one response of each client/proxy entities which will have its Identifier. TLV 160 includes an I-SID field 162, a client/proxy filed 164 and an identifier field 166.

Figure 4:
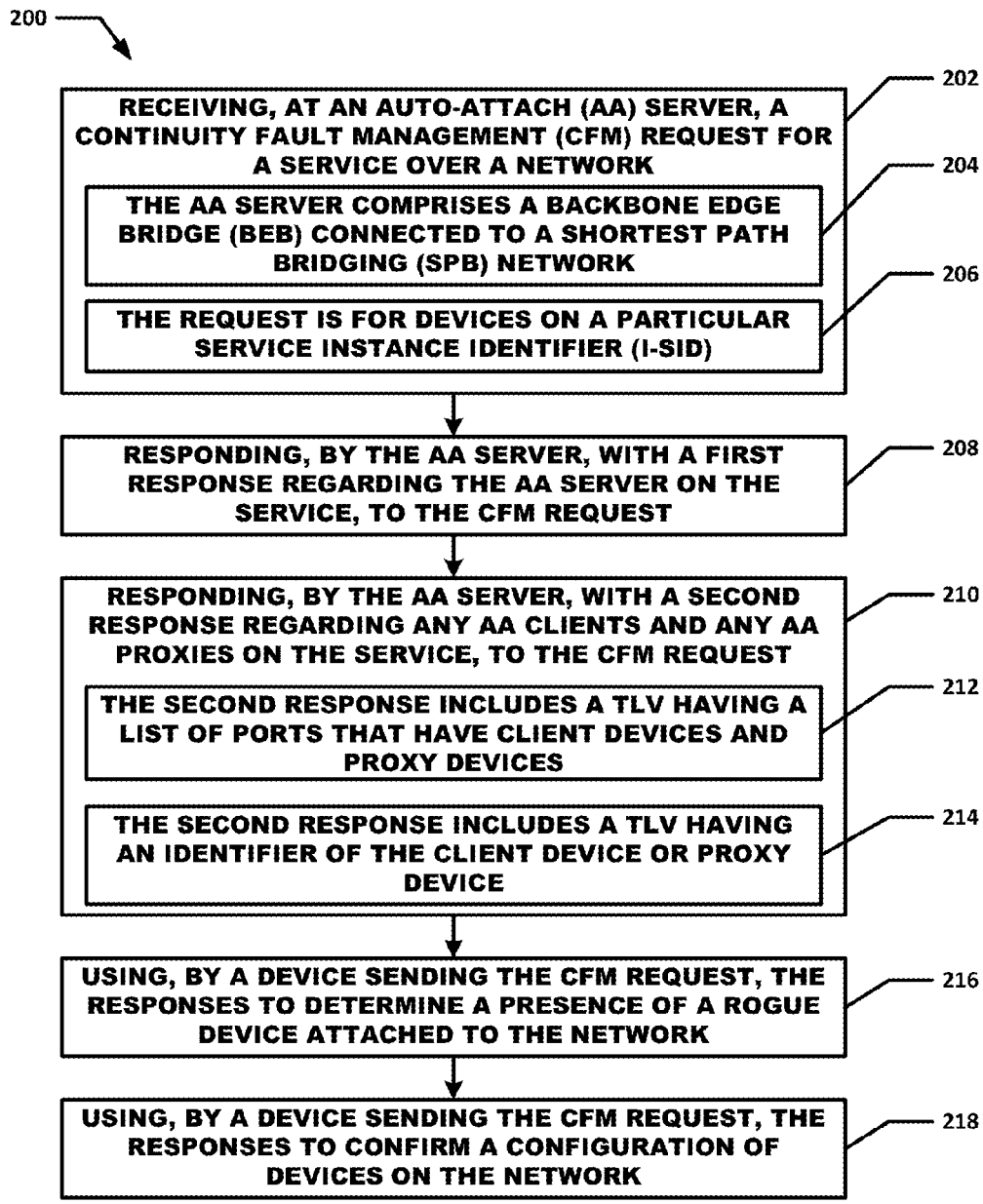
FIG. 4 depicts a flow diagram of a particular embodiment of a method for debugging auto-attach entities (client and proxy) using Connectivity Fault Management (CFM) and Shortest Path Bridging MAC (SPBM) cloud in accordance with a particular embodiment of the present invention.

A flow chart of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method 200 begins with processing block 202 which discloses receiving, at an Auto-Attach (AA) server, a Continuity Fault Management (CFM) request for a service over a network. As shown in processing block 204 the AA server comprises a Backbone Edge Bridge (BEB) connected to a Shortest Path Bridging (SPB) network. As further shown in processing block 206 the request is for devices on a particular Service Instance Identifier (I-SID).

Processing block 208 recites responding, by the AA server, with a first response regarding the AA server on the service, to the CFM request. Processing block 210 states responding, by the AA server, with a second response regarding any AA clients and any AA proxies on the service, to the CFM request. As shown in processing block 212 the second response includes a TLV having a list of ports that have client devices and proxy devices. As shown in processing block 214 the second response includes a TLV having an identifier of the client device or proxy device.

Processing block 216 discloses using, by a device sending the CFM request, the responses to determine a presence of a rogue device attached to the network. Processing block 218 states using, by a device sending the CFM request, the responses to confirm a configuration of devices on the network.

Figure 5:
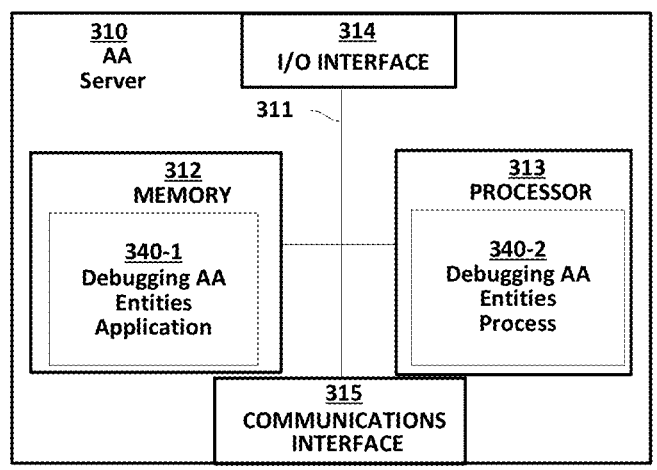
FIG. 5 depicts a block diagram of an AA server in accordance with a particular embodiment of the present invention.

FIG. 5 is a block diagram 300 illustrating example architecture of an AA server 310 that executes, runs, interprets, operates or otherwise performs a debugging AA entities operating application 340-1 and debugging AA entities operating process 340-2 suitable for use in explaining example configurations disclosed herein. As shown in this example, the AA server 310 includes an interconnection mechanism 311 such as a data bus or other circuitry that couples a memory system 312, a processor 313, an input/output interface 314, and a communications interface 315. The communications interface 315 enables the AA server 310 to communicate with other devices (i.e., other computers) on a network (not shown).

The memory system 312 is any type of computer readable medium, and in this example, is encoded with a debugging AA entities operating application 340-1 as explained herein. The debugging AA entities operating application 340-1 may be embodied as software code such as data and/or logic instructions (e.g., code stored in the memory or on another computer readable medium such as a removable disk) that supports processing functionality according to different embodiments described herein. During operation of the AA server 310, the processor 313 accesses the memory system 312 via the interconnect 311 in order to launch, run, execute, interpret or otherwise perform the logic instructions of a debugging AA entities operating application 340-1. Execution of a debugging AA entities operating application 340-1 in this manner produces processing functionality in the debugging AA entities operating process 340-2. In other words, the debugging AA entities operating process 340-2 represents one or more portions or runtime instances of a debugging AA entities operating application 340-1 (or the entire a debugging AA entities operating application 340-1) performing or executing within or upon the processor 313 in the computerized device 310 at runtime.

It is noted that example configurations disclosed herein include the debugging AA entities operating application 340-1 itself (i.e., in the form of un-executed or non-performing logic instructions and/or data). The debugging AA entities operating application 340-1 may be stored on a computer readable medium (such as a floppy disk), hard disk, electronic, magnetic, optical, or other computer readable medium. A debugging AA entities operating application 340-1 may also be stored in a memory system 312 such as in firmware, read only memory (ROM), or, as in this example, as executable code in, for example, Random Access Memory (RAM). In addition to these embodiments, it should also be noted that other embodiments herein include the execution of a debugging AA entities operating application 340-1 in the processor 313 as the debugging AA entities operating process 340-2. Those skilled in the art will understand that the AA server 310 may include other processes and/or software and hardware components, such as an operating system not shown in this example.

During operation, processor 313 of AA server 300 accesses memory system 312 via the interconnect 311 in order to launch, run, execute, interpret or otherwise perform the logic instructions of the debugging AA entities application 340-1. Execution of debugging AA entities application 340-1 produces processing functionality in debugging AA entities process 340-2. In other words, the debugging AA entities process 340-2 represents one or more portions of the debugging AA entities application 340-1 (or the entire application) performing within or upon the processor 313 in the computer system 300.

It should be noted that, in addition to the debugging AA entities process 340-2, embodiments herein include the debugging AA entities application 340-1 itself (i.e., the un-executed or non-performing logic instructions and/or data). The debugging AA entities application 340-1 can be stored on a computer readable medium such as a floppy disk, hard disk, or optical medium. The debugging AA entities application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of debugging AA entities application 340-1 in processor 313 as the debugging AA entities process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
receiving, at an Auto-Attach (AA) server, a Continuity Fault Management (CFM) request
for a service over a network, wherein said service over said network is mapped to a Service Instance Identifier (I-SID);
responding, by said AA server, with a first response regarding said AA server on said
service mapped to said I-SID, to said CFM request; and
responding, based on information stored on said AA server, by said AA server on behalf of any AA client and any AA proxy on said service that is mapped to said I-SID without transmitting said CFM request to said any AA client and said any AA proxy, with a second response regarding said any AA client and said any AA proxy on said service, to said CFM request, wherein said second response includes a Type, Length, Value (TLV) having an identifier of said any AA client device and said any AA Proxy.

2. The method of claim 1 wherein said AA server comprises a Backbone Edge Bridge (BEB) connected to a Shortest Path Bridging (SPB) network.

3. The method of claim 1 wherein said second response includes a Type, Length, Value (TLV) having a list of ports that have client devices and proxy devices.

4. The method of claim 1 further comprising using, by a device sending said CFM request, said responses to determine a presence of a rogue device attached to said network.

5. The method of claim 1 further comprising using, by a device sending said CFM request, said responses to confirm a configuration of devices on said network.

6. A non-transitory computer readable storage medium having computer readable code thereon for debugging auto-attach entities (client and proxy) using Connectivity Fault Management (CFM) and Shortest Path Bridging MAC (SPBM) cloud, the medium including instructions in which a computer system performs operations comprising:
receiving, at an Auto-Attach (AA) server, a Continuity Fault Management (CFM) request for a service over a network, wherein said service over said network is mapped to a Service Instance Identifier (I-SID);
responding, by said AA server, with a first response regarding said AA server on said service that is mapped to said I-SID, to said CFM request; and
responding, based on information stored on said AA server, by said AA server on behalf of any AA client and any AA proxy on said service without transmitting said CFM request to said any AA client and said any AA proxy, with a second response regarding said any AA client and said any AA proxy on said service, to said CFM request, wherein said second response includes a Type, Length, Value (TLV) having an identifier of said any AA client device and said any AA Proxy.

7. The computer readable storage medium of claim 6 wherein said AA server comprises a Backbone Edge Bridge (BEB) connected to a Shortest Path Bridging (SPB) network.

8. The computer readable storage medium of claim 6 wherein said second response includes a Type, Length, Value (TLV) having a list of ports that have client devices and proxy devices.

9. The computer readable storage medium of claim 6 further comprising using, by a device sending said CFM request, said responses to determine a presence of a rogue device attached to said network.

10. The computer readable storage medium of claim 6 further comprising using, by a device sending said CFM request, said responses to confirm a configuration of devices on said network.

11. A computer system comprising:
a memory;
a processor;
a communications interface; and
wherein the memory is encoded with an application for debugging auto-attach entities (client and proxy) using Connectivity Fault Management (CFM) and Shortest Path Bridging MAC (SPBM) cloud, that when performed on the processor, provides a process for processing information, the process causing the computer system to perform the operations of:
receiving, at an Auto-Attach (AA) server, a Continuity Fault Management (CFM) request for a service over a network, wherein said service over said network is mapped to a Service Instance Identifier (I-SID);
responding, by said AA server, with a first response regarding said AA server on said service that is mapped to said I-SID, to said CFM request; and
responding, based on information stored on said AA server, by said AA server on behalf of any AA client and any AA proxy on said service without transmitting said CFM request to said any AA client and said any AA proxy, with a second response regarding said any AA client and said any AA proxy on said service, to said CFM request, wherein said second response includes a Type, Length, Value (TLV) having an identifier of said any AA client device and said any AA Proxy.

12. The computer system of claim 11 wherein said AA server comprises a Backbone Edge Bridge (BEB) connected to a shortest Path Bridging (SPB) network.

13. The computer system of claim 11 wherein said second response includes a Type, Length, Value (TLV) having a list of ports that have client devices and proxy devices.

14. The computer system of claim 11 further comprising using, by a device sending said CFM request, said responses to determine at least one of a group consisting of a presence of a rogue device attached to said network, and a configuration of devices on said network.

* * * * *